Sept. 23, 1930.  C. GARDNER  1,776,469
POWER TRANSMISSION MECHANISM
Original Filed June 27, 1928    4 Sheets-Sheet 1
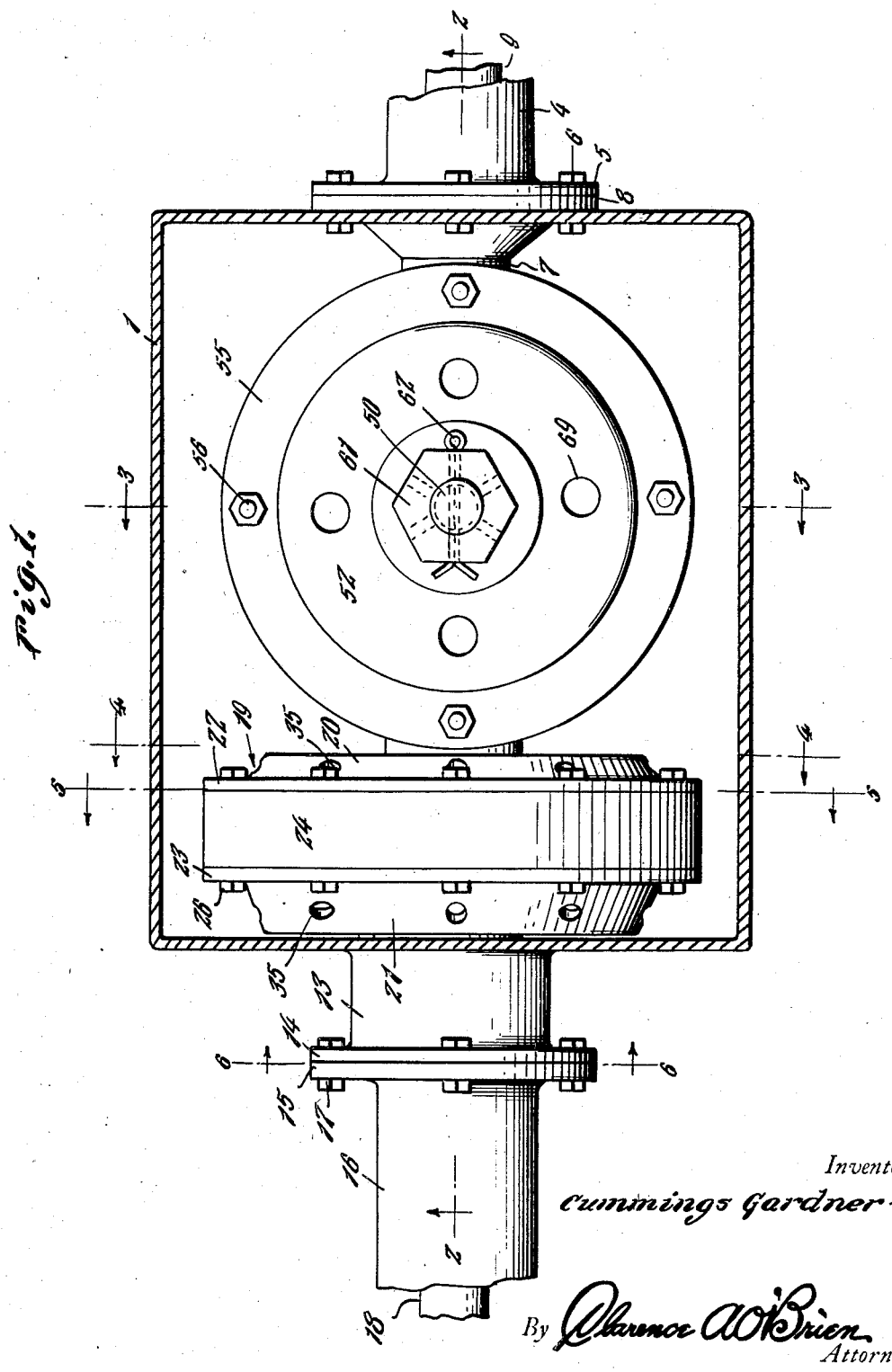
Inventor
Cummings Gardner
By Clarence A. O'Brien
Attorney

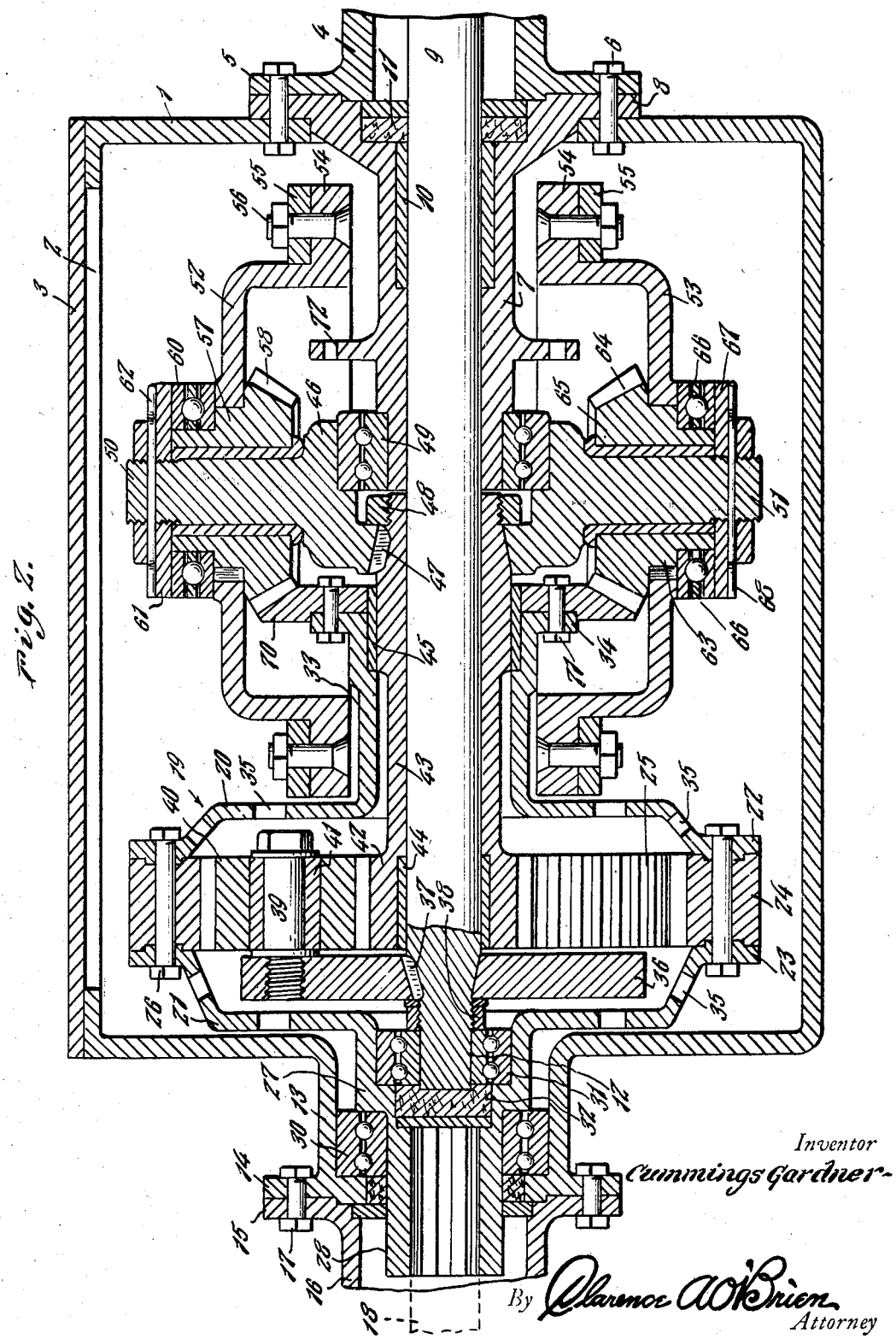

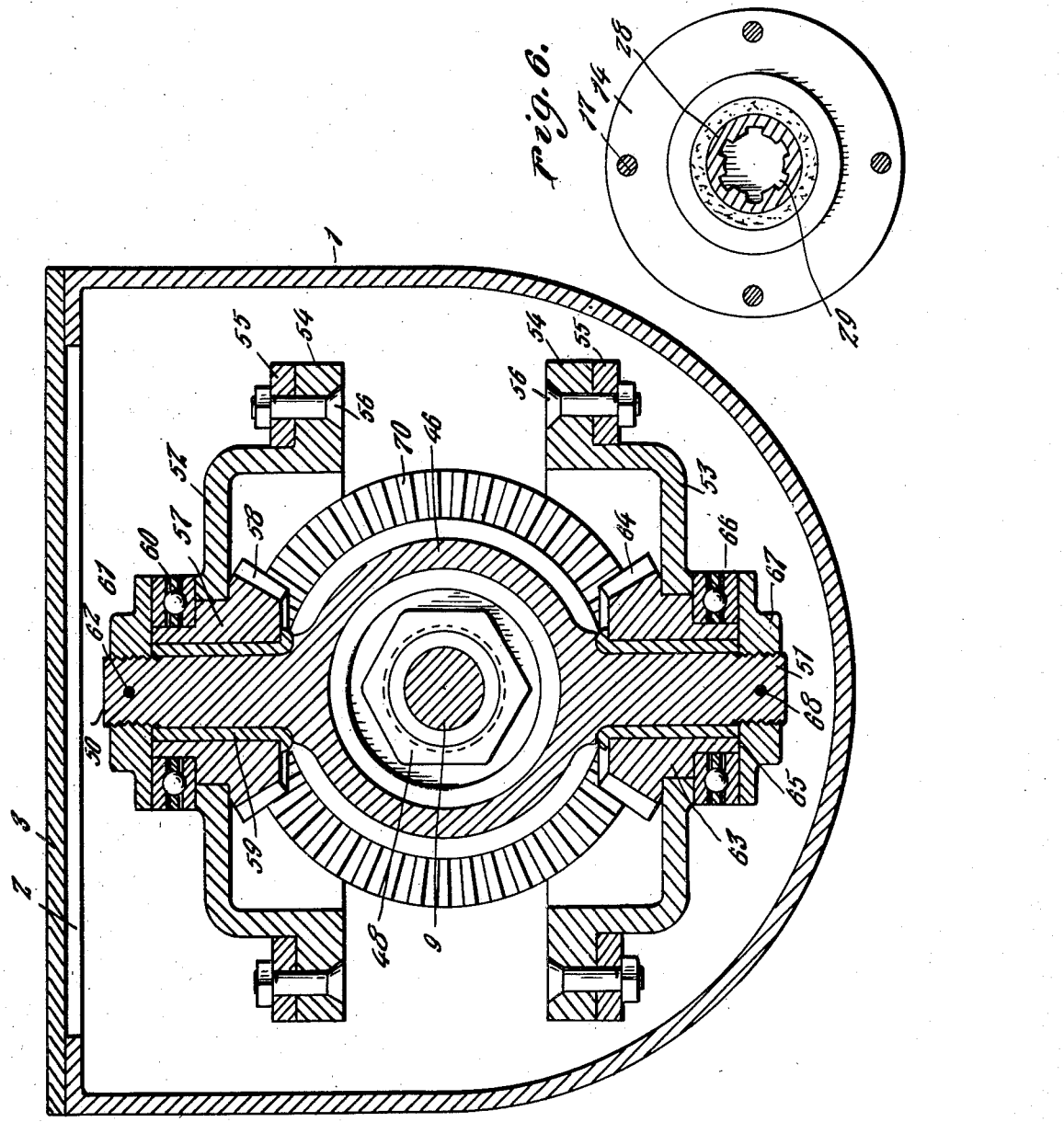

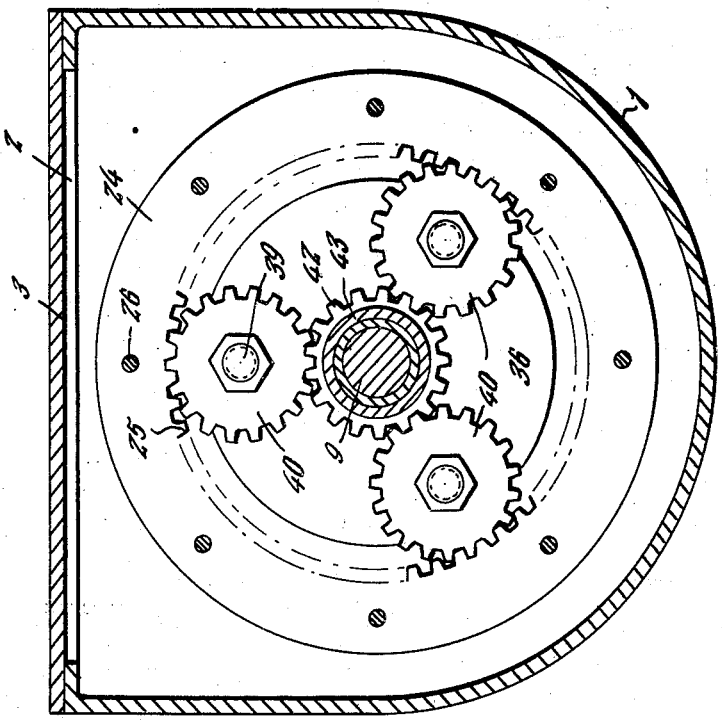
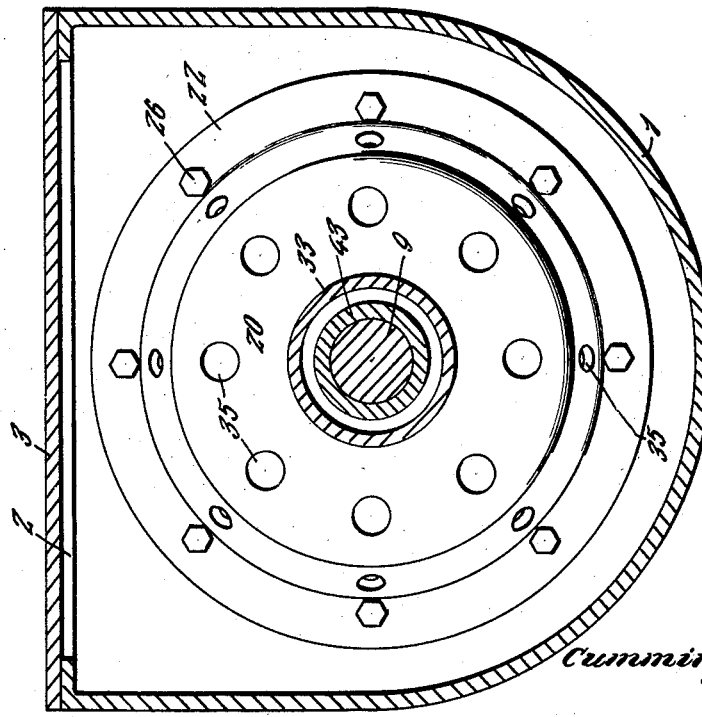

Patented Sept. 23, 1930

1,776,469

UNITED STATES PATENT OFFICE

CUMMINGS GARDNER, OF INGLEWOOD, CALIFORNIA, ASSIGNOR TO AUTOMATIC TRANSMISSION CORPORATION OF AMERICA, OF WILMINGTON, DELAWARE

POWER-TRANSMISSION MECHANISM

Application filed June 27, 1928, Serial No. 288,616. Renewed January 24, 1930.

The present invention relates to improvements in power transmission mechanisms and has reference more particularly to a transmission that is capable of a gradual speed ratio variation controlled automatically by a resistance torque of the load placed upon the driven shaft.

The present invention comprehends certain improvements over the variable speed transmission mechanism disclosed in my co-pending application bearing Serial No. 251,632 filed February 3, 1928.

One of the salient objects of the present invention is to provide a power transmission mechanism which will tend to eliminate the use of any mechanically operated gear shifting mechanism as well as a clutch.

Still a further object is to provide a power transmission mechanism of the above mentioned character that will operate without causing any vibration or sudden jerking, such as frequently results with the gear shifting mechanism now generally in use in power automobiles when the same is operated for causing the motor to operate at either a low, intermediate or high speed.

A further object is to provide a power transmission mechanism that includes a particular inertia member construction that functions to give braking force when a vehicle equipped with my power transmission mechanism descends a steep grade.

A further object is to provide a power transmission mechanism of the above mentioned character wherein the parts are so constructed and arranged as to permit ready access thereto whenever necessary, the mechanism at all times being positive and efficient as well as automatic in its operation.

Other objects and advantages will become apparent during the course of the following description.

In the accompanying drawings, wherein like reference characters designate like parts throughout the several views:

Figure 1 is a top plan view of the power transmission mechanism embodying my invention, the transmission casing being shown in section, Figure 2 is a longitudinal sectional view taken approximately on the line 2—2 of Figure 1, Figure 3 is a transverse section taken approximately on the line 3—3 of Figure 1 for more clearly illustrating the construction of the proposed inertia or fly wheel member, Figure 4 is a similar section taken approximately on the line 4—4 of Figure 1, looking in the direction of the arrows, Figure 5 is a transverse section taken substantially upon the line 5—5 of Figure 1 for more clearly disclosing the arrangement of the planet pinions with respect to the internal ring gear and the centrally located sun gear, and Figure 6 is a sectional view taken approximately on the line 6—6 of Figure 1.

In the drawings for the purpose of illustration is shown the preferred embodiment of my invention, the numeral 1 designates a substantially rectangular shaped transmission casing open at its top, the bottom thereof being slightly rounded as more clearly disclosed in Figures 3, 4 and 5 of the drawings.

An inwardly directed flange 2 is formed at the upper edges of the side and end walls of the casing to which is removably secured to cover plate 3 by any appropriate fastening means not shown.

A tubular housing 4 is formed at its rear end with a flange 5 for attachment to the forward end of the transmission casing 1 by suitable bolts shown at 6, the forward end wall of the casing 1 being formed with an opening that is arranged in alinement with the tubular housing 4.

A longitudinally extending sleeve 7 arranged in the forward end portion of the casing 1, the forward end of this sleeve being enlarged for disposition through the opening formed in the forward end wall of the casing. An annular flange 8 is formed on the forward end of the sleeve for disposition between the outer face of the forward end wall of the casing and the rear face of the flange 5 and the securing bolts 6 also extend through this flange 8 as clearly shown in Figure 2.

In this manner, the sleeve 7 is fixedly supported in the casing and the inner or rear end of the sleeve terminates at the intermediate portion of said casing.

Extending through the housing 4 and also through the sleeve 7 is the drive shaft 9. A bushing 10 is arranged within the sleeve 7 for the intermediate portion of the drive shaft 9 and at the end of this sleeve there is arranged for disposition around the shaft 9 a packing 11.

The rear end of the drive shaft 9 is slightly tapered and terminates in the reduced portion 12 and a portion of the reduced end 12 adjacent the tapered portion of the drive shaft is threaded as clearly disclosed in Figure 2.

The rear end wall of the transmission casing is formed with an opening that is coaxially alined with the opening formed in the forward end wall of the casing and a tubular neck 13 extends outwardly from the rear end of the wall of the transmission casing around this opening and the reduced rear end of the drive shaft extends slightly into the neck 13 as suggested very clearly in Figure 2.

The outer end of the tubular neck 13 is formed with an outwardly directed annular flange 14 to which is secured the flanged forward end 15 of a tubular housing 16 by means of the securing bolt 17. A driven shaft 18 is arranged within the housing 16 and is adapted to be coaxially alined with the drive shaft 9.

The invention further comprehends the provision of a sectional housing unit 19 that is arranged for rotation within the rear end portion of the casing 1 and which is operatively connected with the driven shaft 18 in the manner to be now specifically described.

This sectional housing unit includes opposed inner and outer dished plates 20 and 21 respectively, the outer edges of which are formed with the annular flanges 22 and 23 respectively and secured between the flanged portions 22 and 23 is the annular ring gear 24.

The gear teeth 25 are formed on the inner peripheral face of this member. The securing means between the flanged portions of the dished plates and the internal annular ring gear is illustrated at 26 in Figure 2 and as clearly shown in this particular figure, the portions of the flanges and the adjacent portions of the ring gear are formed with interfitting projections and sockets respectively for the purpose of strengthening the construction of the sectional housing unit.

The outermost plate 21 is formed at its central portion with an outwardly extending sleeve 27 that projects into the tubular neck 13 and this sleeve terminates in the reduced socket member 28 that enters the forward end portion of the tubular housing 16 for receiving the forward end of the driven shaft 18. The inner wall of the cylindrical socket member 28 is formed with longitudinally extending annular spaced grooves 29 for receiving similar shaped ribs formed on the forward end of the driven shaft whereby to provide an interlocking connection between the driven shaft and the sectional housing unit 19 so that these parts will rotate in unison at all times.

A bearing 30 is arranged within the outer end portion of the tubular neck 13 for the cylindrical socket member 28 and a similar bearing 31 is arranged within the sleeve 27 for the reduced rear end of the drive shaft 9 as clearly illustrated in Figure 2 of the drawings.

In addition, a packing 32 is provided for the rear end of the drive shaft at the juncture of the sleeve 27 with the reduced cylindrical portion 28.

The innermost plate 20 of the sectional housing unit 19 is formed with a forwardly extending sleeve portion 33 that encloses the drive shaft 9 and the forward end of this sleeve 33 terminates in spaced relation with respect to the stationary sleeve 7 and is formed with an outwardly directed annular flange 34 for a purpose to be presently described.

The dished plates are formed with the lubricant receiving openings 35, it being understood of course that the transmission casing 1 contains a quantity of lubricating oil in the bottom thereof so that during rotation of the sectional housing unit 19 simultaneously with the driven shaft a quantity of oil will be supplied to the sectional housing unit for lubricating the parts arranged therein through the medium of the openings 35.

Arranged within the sectional housing unit 19 is the planet carrier disk 36, the same being keyed on the tapered portion of the drive shaft 9 as shown at 37 in Figure 2 whereby said planet carrier disk will rotate with the drive shaft.

A nut 38 is threaded on the threaded portion of the drive shaft to prevent displacement of the disk 36 from the tapered portion of the drive shaft 9 as also illustrated in Figure 2. Forwardly extending stud bolts 39 have their threaded ends threaded into suitable openings provided therefor in the disk 36 and in the present instance, three of such stud bolts are provided, the same being equally spaced apart with respect to each other as clearly shown in Figure 5.

Arranged on each of the stud bolts is a planet pinion 40, a bushing 41 being associated with each stud bolt and its respective pinion. These planet pinions do not mesh with each other but have meshing engagement with the teeth 25 of the internal ring gear 24 as very clearly illustrated in Figures 2 and 5 of the drawings.

The three planet pinions do however, have intermeshing engagement with the sun gear 42 that is formed on the rear end of the tubular shaft 43 that surrounds the drive shaft 9 and extends longitudinally through the sleeve 33.

A bushing 44 is provided for the drive shaft 9 at the rear end of the tubular shaft 43 while a bushing 45 is arranged in the forward end portion of the sleeve 33 for the adjacent portion of the tubular shaft 43.

The forward end of the tubular shaft 43 that carries the front gear 42 terminates adjacent the forward end of the stationary sleeve 7 and is furthermore externally threaded.

A hub member 46 is keyed on the forward end portion of the tubular shaft 43 as at 47 and a nut 48 is threaded on the forward threaded end portion of this tubular shaft to retain the hub member against displacement from the forward end of the tubular shaft.

One side of the hub member 46 is cut out to accommodate the bearing 49 and extends around the rear end of the stationary sleeve 7 and as is also clearly shown in Figure 2 of the drawings.

Extending outwardly from the outer peripheral face of the hub member 46 at diametrically opposite points are the radially disposed spindles 50 and 51 respectively. The outer end of each spindle is threaded as shown in Figures 2 and 3.

Forming a salient part of the invention are the inertia or fly wheel members 52 and 53 respectively, the same being adapted for rotation upon the spindles 50 and 51 respectively. Each of these inertia or fly wheel members is of cup shaped formation and an annular flange 54 is formed on the outer free edge of each of these cup shaped members for the purpose of receiving one or more ring like weights 55, the securing means therefor being shown at 56.

The central portion of each of the cup shaped inertia members is formed with an opening and keyed in the opening of the inertia member 52 for rotation therewith is the sleeve 57 that has formed on its inner end of the beveled pinion 58.

A bushing 59 is fitted within the sleeve 57 for engagement with the spindle 50 as clearly suggested in Figures 2 and 3.

A thrust bearing 60 is disposed around the outer end portion of the sleeve 57 and a nut 61 is threaded on the threaded end of the spindle 50 for securing the thrust bearing 60 in position. For the purpose of preventing the accidental rotation of the nut 61, there is provided the cotter key 62 that extends through a transverse opening formed in the threaded end of the spindle 50 and the nut 61 is also formed with radial openings adapted to communicate with the transverse opening formed in the threaded end of the spindle.

A sleeve 63 is keyed in the central opening formed in the other inertia or fly wheel member 53 and a beveled pinion 64 is formed on the inner end of the sleeve 63. A bushing 65 is fitted within the sleeve 63 for engagement with the spindle 51.

A thrust bearing 66 similar to the thrust bearing 60 is associated with the outer end portion of the sleeve 63, and a nut 67 is threaded on the threaded outer end of the spindle 51 for retaining the thrust bearing 66 in its proper position. The threaded end of the spindle 51 is formed with a transverse opening to accommodate the cotter key 68 which is also disposed through communicating openings formed in the nut 67 whereby to secure the nut against accidental disengagement from the threaded end of the spindle 51.

The inertia or fly wheel members are adapted for rotation within the transmission casing about the respective spindles at predetermined times and as will be presently described and these inertia or fly wheel members are operable between the forward end wall of the transmission casing and the revoluble sectional housing unit 19. Each of the cup shaped inertia or fly wheel members is formed with a series of lubricating openings such as are shown at 69 in Figure 1 whereby the parts confined between the opposed inertia members will be properly lubricated during the operation of the power transmission mechanism.

The inertia member carrying unit is operatively connected with the segmental housing unit 19 through the medium of the relatively large bevel gear 70 that is detachably secured on the flange 34 by means of the bolts 71 and in such a manner that the beveled pinions 58 and 64 will have meshing engagement with the bevel gear 70 as suggested in Figure 2.

This bevel gear 70 may be detached from the flange 34 and attached to the flange 72 formed on the stationary sleeve 7 so that the opposed pinions 58 and 64 will be operatively connected for simultaneous actuation.

The operation of my improved power transmission mechanism may be briefly stated as follows. When the power from the motor is applied to the drive shaft 9, the driven shaft 18 will be actuated at the same rate of speed by and through the connection between the drive and driven shaft afforded by reason of the sectional housing unit 19 and the intermeshing gears arranged therein. When operating as a one to one drive, the transmission rotates as a unit about the axis of the drive and driven shafts and no relative movement of the inertia or fly wheel members occurs.

However when a load or force is applied to the driven shaft 18, thereby changing the speed between the drive and driven shafts, the force of the inertia members is transmitted to the driven shaft. The speed ratio variation is controlled automatically by the resistance torque of the load and when such load is placed on the driven shaft, the planet pinions 40 driving the sun gear 42 will result in the rotation of the tubular shaft 43 and the spindles carried thereby will also rotate about the axis of the drive shaft.

The inertia members 52 and 53 will then be forced to rotate about their respective spindles and when rotating, these inertia members transmit their power of resistance to the driven shaft through the sectional housing unit 19 which in turn transmits the resistance to the driven shaft so that the driven shaft will again rotate at the same rate of speed as the drive shaft whereupon the inertia members will not rotate about their respective spindles but will rotate as a unit with the hub and the spindle about the drive shaft.

In this manner, the speed ratio between the drive and driven shaft will change automatically in a gradual and even manner coincident with the load placed upon the driven shaft.

A power transmission mechanism of this character may not only be used in conjunction with automobiles but can equally as well be employed upon a lathe, milling machine, rotary drilling machinery or in fact any other mechanism that employs drive and driven shafts that are interconnected by a transmission.

The inertia members can also be used to give a braking force when a vehicle descends a steep grade. The vehicle may descend the hill on compression or the drive shaft may be locked and the inertia members thereby caused to offer resistance due to their rotation.

On very steep grades, the vehicle may be placed in reverse and the power of the motor used to hold the car and by accelerating the motor, the car will be caused to descend the grades.

While I have shown the spindles that supports the inertia or fly wheel members as being disposed at right angles with respect to the drive shaft, it is to be understood that the spindles may be disposed at any desirable angle with respect to said drive shaft. The compactness of my improved power transmission mechanism enables the parts to be readily and easily assembled or disassembled and furthermore the transmission mechanism will at all times be positive and efficient as well as automatic in its operation.

While I have shown the preferred embodiment of my invention, it is to be understood that various changes in the size, shape and arrangement of parts may be resorted to without departing from the spirit of the invention and the scope of the appended claims.

Having thus described my invention, what I claim as new is:

1. In a power transmission mechanism, a casing, a drive shaft extending into the same, a driven shaft at the opposite side of the casing and arranged coaxially with the drive shaft, means for operatively connecting the adjacent ends of the shafts together to effect the rotation of the same at the same speed, said means comprising a gear unit carried by the drive shaft, an orbit gear carried by the driven shaft and having cooperation with the aforementioned gear unit, an additional gear unit carried by the drive shaft for cooperation with the first mentioned gear unit, and inertia control means within the casing for cooperation with the last mentioned gear unit and the orbit gear to vary the speed of rotation of the shafts coincident with the load placed on the driven shaft, said last mentioned means including a member carried by the last mentioned gear unit, opposed spindles extending from said member, opposed inertia members capable of rotation about the respective spindles, and meshing gearing between the inertia members and the gear unit carried by the driven shaft.

2. In a power transmission mechanism, a casing, a drive shaft extending into the same, a driven shaft at the opposite side of the casing and arranged coaxially with the drive shaft, means for operatively connecting the adjacent ends of the shafts together to effect the rotation of the same at the same speed, said means comprising a gear unit carried by the drive shaft, an orbit gear carried by the driven shaft for cooperation with the aforementioned gear unit, an additional gear unit carried by the drive shaft for cooperation with the first mentioned gear unit, inertia control means within the casing for cooperation with the last mentioned gear unit and the orbit gear to vary the speed of rotation of the shafts coincident with the load placed on the drive shaft, said last mentioned means including a member carried by the last mentioned gear unit, opposed spindles extending from said member, opposed inertia members capable of rotation about the respective spindles, meshing gearing between the inertia members and the gear unit carried by the driven shaft, and removable weights carried by the inertia members.

3. In a power transmission mechanism, a casing, a drive shaft extending into one side thereof, a driven shaft at the opposite side of the casing arranged coaxially with the drive shaft, a sectional housing unit carried by the inner end of the driven shaft for rotation therewith, an internal ring gear carried by said unit, a planet carrier disk secured on the inner end of the drive shaft for rotation therewith and disposed within the sectional housing unit, planet pinions arranged for rotation on the planet carrier for meshing engagement with the internal ring gear to provide an operative connection between the drive and driven shafts, and to effect the rotation of said shafts at the same rate of speed, a sun gear carrier unit having cooperation with the planet pinions, and rotatable inertia control means within the casing for cooperation with the sectional housing unit and the sun gear carrier unit to vary the speed of rotation of the drive and driven shafts coincident with the load placed upon the driven shaft.

4. In a power transmission mechanism, a casing, a drive shaft extending into one side thereof, a driven shaft at the opposite side of the casing arranged coaxially with the drive shaft, a sectional housing unit carried by the inner end of the driven shaft for rotation therewith, an internal ring gear carried by said unit, a planet carrier disk secured on the inner end of the drive shaft for rotation therewith and disposed within the sectional housing unit, planet pinions arranged for rotation on the planet carrier for meshing engagement with the internal ring gear to provide an operative connection between the drive and driven shafts, and to effect the rotation of said shafts and at the same rate of speed, a sun gear carrier unit for cooperation with the planet pinions, and inertia control means within the casing for cooperation with the sectional housing unit and the sun gear carrier unit to vary the speed of rotation of the drive and driven shafts coincident with the load placed upon the driven shaft, said last mentioned means including a pair of opposed inertia members capable of rotation in angular relation with respect to the drive shaft.

5. In a power transmission mechanism, a casing, a drive shaft extending into one side thereof, a driven shaft at the opposite sides of the casing arranged coaxially with the drive shaft, a sectional housing unit carried by the inner end of the driven shaft for rotation therewith, an internal ring gear carried by said unit, a planet carrier disk secured on the inner end of the drive shaft for rotation therewith and disposed within the sectional housing unit, planet pinions arranged for rotation on the planet carrier for meshing engagement with the internal ring gear to provide an operative connection between the drive and driven shafts, and to effect the rotation of said shafts at the same rate of speed, and inertia control means within the casing for cooperation with the sectional housing unit to vary the speed of rotation of the drive and driven shafts coincident with the load placed upon the driven shaft, said last mentioned means including a tubular shaft surrounding the inner end portion of the drive shaft, a sun gear on the inner end of the tubular shaft for meshing engagement with the planet pinions, a hub member secured on the other end of the tubular shaft for rotation therewith, opposed spindles extending radially from said hub member, inertia members rotatably mounted on the respective spindles, and gearing interconnecting the members with the sectional housing unit.

6. In a power transmission mechanism, a casing, a drive shaft extending into one side thereof, a driven shaft at the opposite side of the casing arranged coaxially with the drive shaft, a sectional housing unit carried by the inner end of the driven shaft for rotation therewith, an internal ring gear carried by said unit, a planet carrier disk secured on the inner end of the drive shaft for rotation therewith and disposed within the sectional housing unit, planet pinions arranged for rotation on the planet carrier for meshing engagement with the internal ring gear to provide an operative connection between the drive and driven shafts, and to effect the rotation of said shafts at the same rate of speed, and inertia control means within the casing for cooperation with the sectional housing unit to vary the speed of rotation of the drive shaft and driven shaft coincident with the load placed upon the driven shaft, said last mentioned means including a tubular shaft surrounding the inner end portion of the drive shaft, a sun gear on the inner end of the tubular shaft for meshing engagement with the planet pinions, a hub member secured on the other end of the tubular shaft for rotation therewith, opposed spindles extending radially from said hub member, inertia members rotatably mounted on the respective spindles, gearing interconnecting the members with the sectional housing unit, and weights removably carried by the inertia members.

7. In a power transmission mechanism, a casing, a drive shaft extending into one side thereof, a driven shaft at the opposite side of the casing arranged coaxially with the drive shaft, a sectional housing unit carried by the inner end of the driven shaft for rotation therewith an internal ring gear carried by said unit a planet carrier disk secured on the inner end of the drive shaft for rotation therewith and disposed within the sectional housing unit, planet pinions arranged for rotation on the planet carrier for meshing engagement with the internal ring gear to provide an operative connection between the drive and driven shafts, and to effect the rotation of said shafts at the same rate of speed, and inertia control means within the casing for cooperation with the sectional housing unit to vary the speed of rotation of the drive and driven shafts coincident with the load placed upon the driven shaft, said last mentioned means including a tubular shaft surrounding the inner end portion of the drive shaft, a sun gear on the inner end of the tubular shaft for meshing engagement with the planet pinions, a hub member secured on the other end of the tubular shaft for rotation therewith, opposed spindles extending radially from said hub member, inertia members rotatably mounted on the respective spindles, and gearing interconnecting the members with the sectional housing unit, said sectional housing unit and the inertia members being provided with lubricant receiving openings.

8. A power transmission mechanism, a casing, a drive shaft extending into one side thereof, a driven shaft at the opposite side of the casing arranged co-axially with the drive shaft, a sectional housing unit carried by the inner end of the driven shaft for rotation therewith, an orbit gear carried by the unit, a planet carrier secured on the inner end of the drive shaft for rotation therewith and disposed within the sectional housing unit, planet pinions arranged for rotation on the planet carrier and having meshing engagement with the orbit gear, to provide an operative connection between the drive and driven shafts and to effect the rotation of said shafts at the same rate of speed, a tubular shaft surrounding the inner end portion of the drive shaft, a sun gear on the inner end of the tubular shaft for meshing engagement with the planet pinions, a hub member secured on the other end of the tubular shaft for rotation therewith, opposed spindles extending radially from the hub member, inertia members rotatably mounted on the respective spindles, a sleeve extending axially from the sectional housing unit around the tubular shaft, and intermeshing gears interconnecting the inertia members with the sleeve to vary the speed of rotation of the drive and driven shafts coincident with the load placed upon the driven shafts.

9. A power transmission mechanism, a casing, a drive shaft extending into one side thereof, a driven shaft at the opposite side of the casing arranged co-axially with the drive shaft, a sectional housing unit carried by the inner end of the driven shaft for rotation therewith, an orbit gear carried by the unit, a planet carrier secured on the inner end of the drive shaft for rotation therewith and disposed within the sectional housing unit, planet pinions arranged for rotation on the planet carrier and having meshing engagement with the orbit gear to provide an operative connection between the drive and driven shafts and to effect the rotation of said shafts at the same rate of speed, a tubular shaft surrounding the inner end portion of the drive shaft, a sun gear on the inner end of the tubular shaft for meshing engagement with the planet pinions, a hub member secured on the other end of the tubular shaft for rotation therewith, opposed spindles extending radially from the hub member, inertia members rotatably mounted on the respective spindles, a sleeve extending axially from the sectional housing unit around the tubular shaft, a sleeve encircling each spindle and being keyed to the respective inertia member, a beveled gear on the inner end of each sleeve, and a gear carried by the outer end of the sleeve for cooperation with the beveled gear for varying the speed of rotation of the driven and drive shaft coincident with the load placed upon the driven shaft.

10. In a power transmission, a casing, a drive shaft extending into the same, a driven shaft at the opposite side of the casing and arranged coaxially with the drive shaft, means for operatively connecting the adjacent ends of the shafts together to effect the rotation of said shafts at the same speed, said means comprising a gear unit carried by the driven shaft, an additional gear unit carried by the drive shaft for cooperation with the first mentioned gear unit, and rotatable inertia control means within the casing driven by each of said additional gear units and cooperating with said first mentioned gear to vary the speed of rotation of the shafts coincident with the load placed upon the driven shaft, said inertia control means including a cup-shaped member, an annular flange formed on the outer free edge of the cup shaped member, and ring-like weights detachably secured on said flange.

11. In a control for a transmission mechanism, two concentric sleeves, radial pintles carried by one of the sleeves, rotatable inertia members mounted on the pintles and operatively connected with the second sleeve.

12. In an automatic transmission, a drive shaft, a driven shaft, differential means for connecting said shafts in various speed ratios, a sleeve rotatably mounted on the drive shaft, and driven by an element of the first mentioned means, radially disposed pintles carried by said sleeve, and rotatable inertia members mounted on the pintles and operatively connected with a second element of said first mentioned means.

13. In a variable speed transmission mechanism, a drive shaft, a driven shaft, differential means for operatively connecting said shafts together, in combination therewith, a sleeve rotatable on the drive shaft and driven by an element of said first mentioned means, pintles extending radially from the sleeve, rotatable inertia members mounted on said pintles, and gearing operatively connecting the inertia members with a second element of the first mentioned means to automatically vary the speed ratio of the transmission.

In testimony whereof I affix my signature.

CUMMINGS GARDNER.